United States Patent [19]

Kato

[11] 4,348,441

[45] Sep. 7, 1982

[54] FIBROUS INSULATING MATERIAL AND INSULATING WALL

[75] Inventor: Takeo Kato, Toyokawa, Japan

[73] Assignee: Isolite Babcock Refractories Co., Ltd., Aichi, Japan

[21] Appl. No.: 187,762

[22] Filed: Sep. 16, 1980

Related U.S. Application Data

[63] Continuation of Ser. No. 1,386, Jan. 5, 1979, abandoned.

[51] Int. Cl.[3] .............................................. C04B 43/02

[52] U.S. Cl. ........................................ 428/49; 428/51; 428/54; 428/58; 428/65; 428/113; 428/114; 428/119; 428/120; 428/174

[58] Field of Search ........................ 428/45, 47, 48, 49, 428/51, 65, 113, 114, 119, 120, 174, 54, 44, 58; 156/62.2

[56] References Cited

U.S. PATENT DOCUMENTS 3,012,923 12/1961 Slayter .............................. 156/62.2
3,819,468 6/1974 Sauder ................................ 428/114
4,025,680 5/1977 Botsolas ............................. 428/114

*Primary Examiner*—Marion McCamish
*Attorney, Agent, or Firm*—A. W. Breiner

[57] ABSTRACT

Fibrous insulating material consisting of a rectangular or semi-cylindrical block obtained by stacking ceramic fiber blankets or felt in the thickness direction thereof and bonding contact surfaces of adjacent blankets or felt to each other with an adhesive. Such insulating fire material is bonded to the furnace surface such that the bonded surfaces are perpendicular to the wall surface. By using the fibrous insulating material which is ready to handle, it is possible to facilitate and reduce time required for construction of the insulating wall.

11 Claims, 9 Drawing Figures

FIG. 2
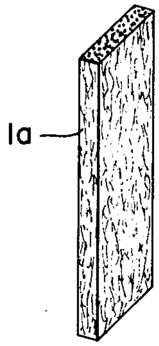
FIG. 1
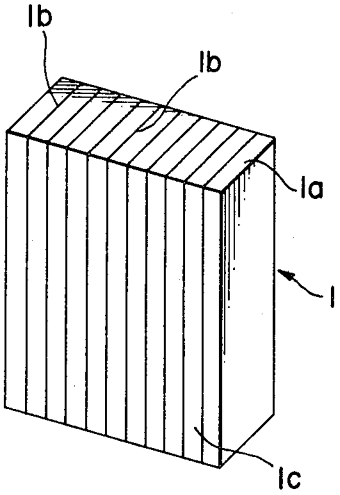
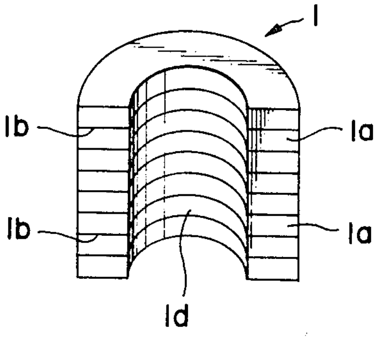
FIG. 3
FIG. 9
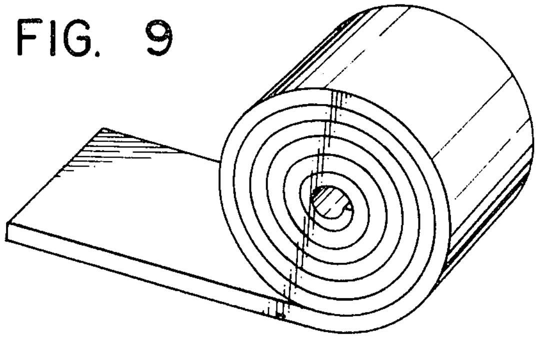

FIBROUS INSULATING MATERIAL AND INSULATING WALL

This is a continuation of application Ser. No. 001,386 filed Jan. 5, 1979, now abandoned.

BACKGROUND OF THE INVENTION

1. Field of the Invention

This invention relates to a fibrous insulating material used for various furnaces and also to an insulating wall using such a fibrous insulating material.

2. Description of the Prior Art

The ceramic fiber blanket (or felt) used as insulating material is usually manufactured in a continuous long form, and it is thus cut to a suitable length and rolled for shipment as shown in FIG. 9. When applying it to a furnace inner surface or the like, in a stacked manner it is cut to a suitable length, and the cut ceramic fiber blanket pieces are applied to the furnace wall in the form of a stack by using securing means or bonded to the furnace wall. The above mentioned art of using the ceramic fiber blanket (or felt) has been disclosed in Japanese Patent Publications Nos. 39825/1971 and 14085/1978.

However, this blanket is very light and soft like cotton, so that it is likely to be broken or elongated at the time of installation unless it is handled very carefully, thus requiring considerable time for installation work. In addition, it has been the practice to secure it to the furnace wall by using bolts, nuts or rods made of heat-resistant alloy. Use of such mounting members for the installation not only requires time for installation work but requires the furnace outer wall to be sufficiently strong to support the weight of these mounting members.

When using such ceramic fiber blanket strip, therefore, it has been applied in a considerably long form for increasing the installation efficiency. However, the longer the blanket piece the greater is the thermal shrinkage so that a gap results between adjacent pieces in the extreme case, that is, the installation efficiency and performance of installation surface go counter to each other.

SUMMARY OF THE INVENTION

An object of the invention is to provide a fibrous insulating material, which consists of ceramic fiber blanket pieces which are ready to handle and readily capable of processing.

Another object of the invention is to provide a fibrous insulating material, which does not require any mounting member, can be simply and quickly applied and has sufficient insulation property.

To achieve the above ends, according to the invention the fibrous insulating material is formed by stacking ceramic fiber blanket pieces in the thickness direction and bonding contact surfaces of adjacent blanket pieces to each other to obtain a block which is bonded to the wall surface.

BRIEF DESCRIPTION OF THE DRAWINGS

FIG. 1 is a perspective view of an embodiment of the fibrous insulating material according to the invention;

FIG. 2 is a perspective view of a ceramic fiber piece which is a constituting element of the embodiment of FIG. 1;

FIG. 3 is a perspective view of another embodiment of the fibrous insulating material;

FIG. 9 is a perspective view of a commercially available ceramic fiber blanket.

DETAILED DESCRIPTION OF PREFERRED EMBODIMENTS

According to the invention a ceramic fiber blanket or felt as shown in FIG. 9 is cut into piece 1*a* as shown in FIG. 2, for instance with a length of 15 to 60 cm and a width of 2.5 to 30 cm, and such blanket pieces are stacked together with the contact surfaces 1*b* of adjacent blanket pieces entirely bonded together with an organic adhesive, thus forming a fibrous insulating material 1 in the form of a rectangular block. As another example, pieces 1*a* obtained by diametrically bisecting stamped-out blanket pieces of a hollow disc form are stacked together similar to the case of FIG. 1 with the contact surfaces of adjacent pieces entirely bonded together with an adhesive to obtain a semi-cylindrical block.

The adhesive used is an adhesive which is gasified and burnt away at the working temperature. The fibrous insulating material may have rectangular, semi-cylindrical and various other shapes depending upon use.

With the above structure of the block, in which the contact surface of adjacent pieces is entirely bonded together by an adhesive, the bonded surfaces bonded by the adhesive serve as core, and the structure is as strong as if it incorporated cores. Thus, not only the handling is facilitated, but also the block may be readily cut by means of a knife so that it may fit the shape of the locality of its installation. Further, the installation may be made quickly compared to the case of installing what is obtained by cutting the rolled blanket as shown in FIG. 9 to a desired length or likewise handling soft or flexible materials like belts.

Figure 4:
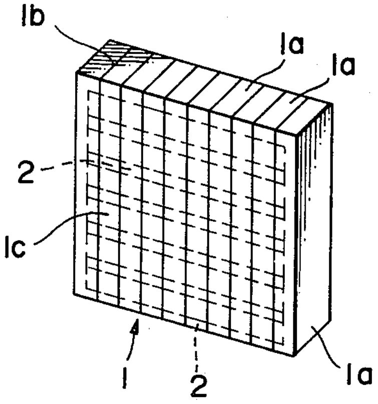
FIG. 4 is a detailed perspective view of the embodiment of FIG. 1.
Figure 5:
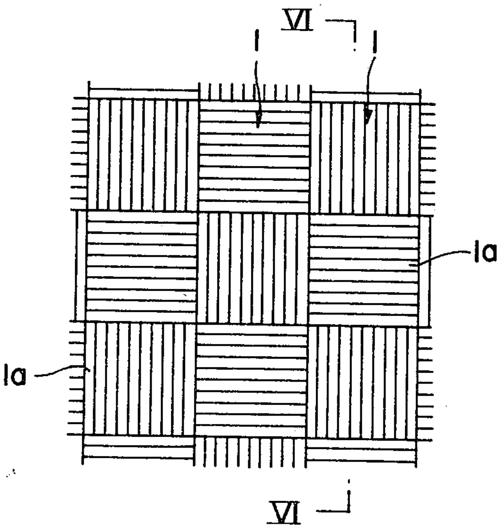
FIG. 5 is an elevational view of an embodiment of the insulating wall according to the invention.
Figure 6:
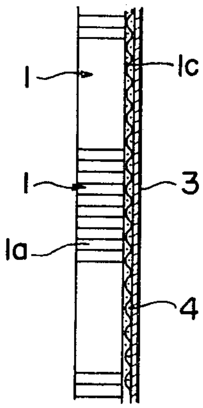
FIG. 6 is a sectional view taken along line VI—VI in FIG. 5.

FIGS. 4 to 6 show an embodiment, in which a furnace wall is formed by using fibrous insulating material as shown in FIG. 1. Each fibrous insulating material is provided on its surface 1*c* crossing the bonded surfaces 1*b* of adjacent pieces 1*a* with refractory adhesive layers 2 along the four sides and also the bonded surfaces of adjacent pieces 2, and the individual fibrous insulating materials 1 thus provided with refractory adhesive layers 2 are successively stacked in a mosaic form with their surface 1*c* bonded to a metal net 4 mounted on the inner surface of a shell 3.

Where fibrous insulating materials are directly bonded to the shell 3, the adhesion property obtainable is inferior, but by bonding them via metal latch or metal net they can be securely bonded since the refractory adhesive layers 2 are solidified in the state wrapping the metal net wires.

They may be bonded to the surface of already formed insulating fire brick dense fire brick, refractory castable and refractory plastic structures instead of bonding them to metal lath or metal nets.

Figure 7:
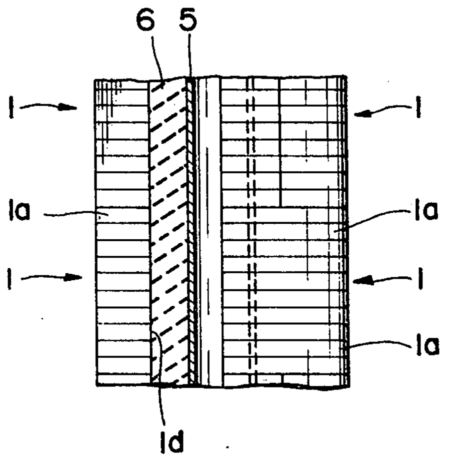
FIG. 7 is a sectional view similar to FIG. 6 but showing another embodiment of the insulating wall.
Figure 8:
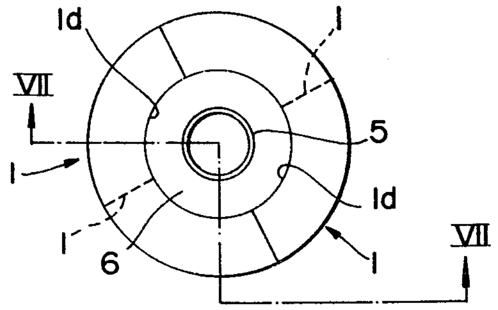
FIG. 8 is a plan view of the embodiment of FIG. 7.

FIGS. 7 and 8 show another embodiment of the invention, in which the invention is applied to the outer periphery of the pillar-like body. In this embodiment, fibrous insulating materials 1 in a semi-cylindrical block form obtained by stacking and bonding together many ceramic fiber blanket pieces 1*a* obtained by diametrically bisecting hollow discs stamped out from a ceramic fiber blanket as shown in FIG. 3 are used. They may be provided on their inner surface 1*d* with refractory adhesive layers 2 in a manner similar to FIG. 4 and then they are stacked upwards by bonding to surround the entire outer periphery of a refractories structure or refractory mortar 6 provided in contact with a skid pipe 5 cooled with water passed therethrough, thus forming an insulating wall.

For stacking and binding together ceramic fiber blanket pieces, it may be through to (a) bind the stack by passing wires in the direction of stacking, (b) winding paper tape on the stack so that the pieces will no longer separate from one another and (c) wrap the stack with paper or polyethylene sheets. In the case of (a), the process itself requires considerable man-hour and also requires extra expenditure. In the case of (b) the corners are crushed so that undesired gaps are formed when the blocks thus formed are applied side by side to the wall of the furnace. In the case of (c) the resultant package is likely to be broken since the content is soft, and it is impossible to select a desired shape. In either case, a cutting process cannot be carried out. In contrast, the fibrous insulating material according to the invention is free from the above problems, and it is easily handled and readily installed. Also, with the fibrous insulating material according to the invention, in which the ceramic fibers in the ceramic fiber blanket are made in manufacture to mainly extend in the direction normal to the thickness direction, although the tensile strength in the thickness direction is nearly zero, there is considerable tensile strength in the direction normal to the thickness direction, and the ceramic fiber blanket is disposed at right angles to the wall surface with its one end bonded thereto so as to effectively utilize the tensile strength. Thus, there is no possibility of peeling-off in the layer form, and the weight of the material can be supported by itself, permitting an insulating wall consisting of the ceramic fiber blanket which can be inexpensively installed without requiring any mounting member. Also, since fibrous insulating materials each consisting of a readily handled block of ceramic fiber blanket pieces bonded to one another as mentioned earlier, the installation work is simple, and the time required for the installation work can be considerably reduced compared to the prior art. Further, since the materials are bonded to the wall surface constituted by metal latch, bricks, mortar, etc., via refractory adhesive layers 2 spaced apart in the direction of extension of the fibers, the difference in expansion and contraction between wall surface and ceramic fiber blanket bonded thereto can be sufficiently absorbed in the spaces between adjacent refractory adhesive layers 2. Furthermore, since the refractory adhesive layers 2 are provided in a direction crossing the bonded surfaces of adjacent blanket pieces which are component elements of the fibrous insulating material, the strength of the bonded surface reinforced by the adhesive on the pieces 1*a* can be effectively utilized to ensure reliable bonding to the wall surface. Moreover, since no mounting member is necessary, the heat insulation property of the ceramic fiber can be utilized to a greater extent compared to the prior art in constructing the insulating wall. According to the invention, it is also possible to apply the materials in several layers as well depending upon the thickness of the insulating wall.

I claim:

1. A furnace wall construction comprising a furnace wall and a fibrous insulation bonded thereto consisting of an insulating material obtained by stacking ceramic fiber blankets in the thickness direction and bonding together contact surfaces of adjacent fiber blankets by applying adhesive layers to at least one surface of said material, said adhesive being gasified and burnt away at the operating temperature of the furnace, said fibrous insulating material being thereafter bonded to said furnace wall.

2. A furnace wall according to claim 1 wherein said fibrous insulating material is rectangular.

3. A furnace wall according to claim 2 wherein said fibrous insulating material is provided on its surface at right angles to said bonded surfaces with said adhesive layers along the four sides and also along said bonded surfaces.

4. A furnace wall according to claim 1 wherein said fibrous insulating material is semi-cylindrical.

5. A furnace wall according to claim 1 including joining means between said adhesive layers and said furnace wall.

6. A furnace wall according to claim 5 wherein said joining means is a metal net.

7. A furnace wall according to claim 5 wherein said joining means is a metal lath.

8. A furnace wall according to claim 1 wherein said wall is made of a member of the group consisting of refractory bricks, refractory castables and refractory plastics.

9. A fibrous ceramic insulation comprising a plurality of ceramic fiber blankets stacked in the thickness direction and bonded together at contact surfaces of adjacent fiber blankets with an organic adhesive layer, said organic adhesive layer being completely gasified at the operating temperature of a furnace having the insulation applied to a wall thereof.

10. The ceramic insulation of claim 9 wherein said plurality of blankets are rectangular.

11. The ceramic insulation of claim 10 wherein said insulation has a metal joining material bonded on one major surface thereof.

* * * * *